United States Patent

Broszat

[11] Patent Number: 5,213,435
[45] Date of Patent: May 25, 1993

[54] ADJUSTABLE FASTENING OF A BALL JOINT TO A TIE ROD FOR STEERING LINKAGES OF MOTOR VEHICLES

[75] Inventor: Lothar Broszat, Monheim, Fed. Rep. of Germany

[73] Assignee: TRW Ehrenreich GmbH & Co. KG, Dusseldorf, Fed. Rep. of Germany

[21] Appl. No.: 684,045

[22] Filed: Apr. 11, 1991

[30] Foreign Application Priority Data

Apr. 14, 1990 [DE] Fed. Rep. of Germany ... 9004325[U]

[51] Int. Cl.$^5$ .............................................. F16C 11/06
[52] U.S. Cl. ..................... 403/122; 403/75; 403/93; 280/846
[58] Field of Search ............ 403/75, 76, 77, 78, 403/123-126, 148, 122, 127, 92, 93; 280/95.1, 846, 673

[56] References Cited

U.S. PATENT DOCUMENTS

| | | |
|---|---|---|
| 2,077,844 | 4/1937 | Leighton ............................ 403/157 |
| 2,371,835 | 3/1945 | McNamara, Jr. ............ 280/95.1 X |
| 3,549,167 | 12/1970 | Haverbeck ....................... 403/75 X |
| 3,923,409 | 12/1975 | Stoner .................................. 403/290 |
| 4,162,859 | 7/1979 | McAfee ....................... 280/95.1 X |
| 4,714,262 | 12/1987 | Wood ................................ 280/95.1 |
| 4,875,697 | 10/1989 | Miller ............................... 280/95.1 |

FOREIGN PATENT DOCUMENTS 0416981  3/1991  European Pat. Off. ........... 280/95.1
3739704  8/1989  Fed. Rep. of Germany.

Primary Examiner—Andrew V. Kundrat
Assistant Examiner—Harry C. Kim
Attorney, Agent, or Firm—Tarolli, Sundheim & Covell

[57] ABSTRACT

The subject of the invention is an adjustable fastening of a ball joint (2) to a tie rod (1) for steering linkages of motor vehicles, with a ball-ended wrist pin (12) movable in all directions located in a universal joint housing (14), which is arranged in a fastening plate (16) with a bearing hole (18), a fastening element (screw 22) fixed on the tie rod, which passes through the bearing hole (18), so that the fastening plate (16) is supported swiveling around the fastening element (screw 22) and a locking element engaging with the fastening plate (16) for fixing of the ball joint (2) in a defined swiveled position. A fastening of this type which is adjustable simply and without special tools, has a low construction cost and nevertheless offers sufficient safety against an unintentional adjustment of the fastening during operation, is created by the fact that the locking element is a threaded joint (30), which is arranged perpendicular to axis (31) of the fastening element (screw 22) and engages with the gear-tooth system (19) arranged on the fastening plate (16).

16 Claims, 2 Drawing Sheets

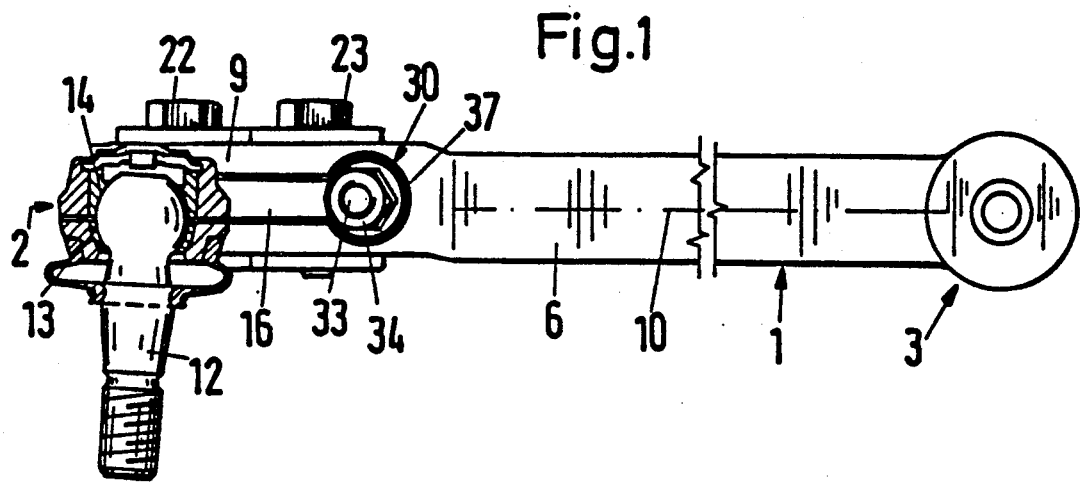
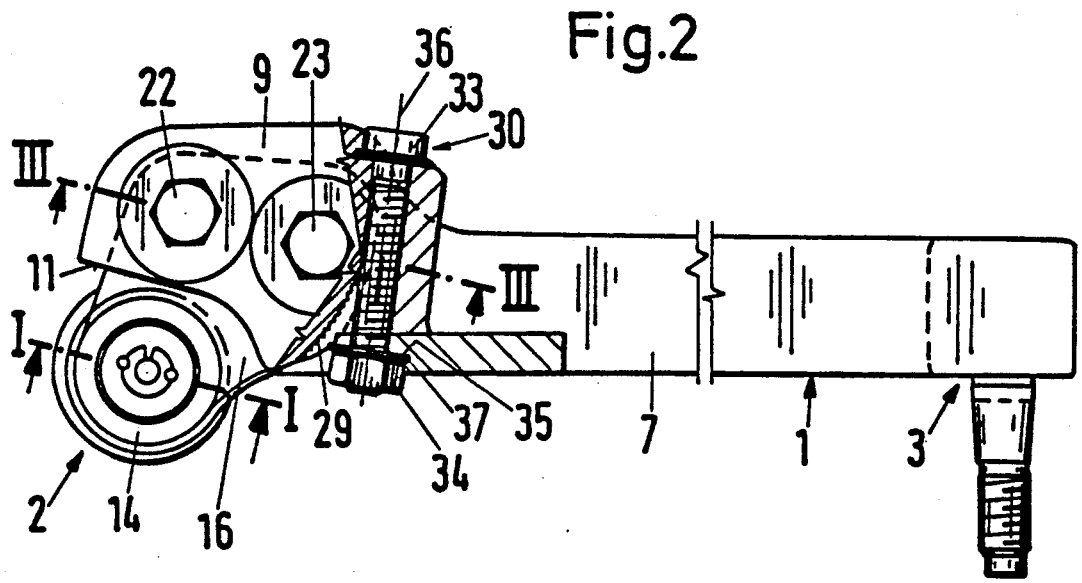
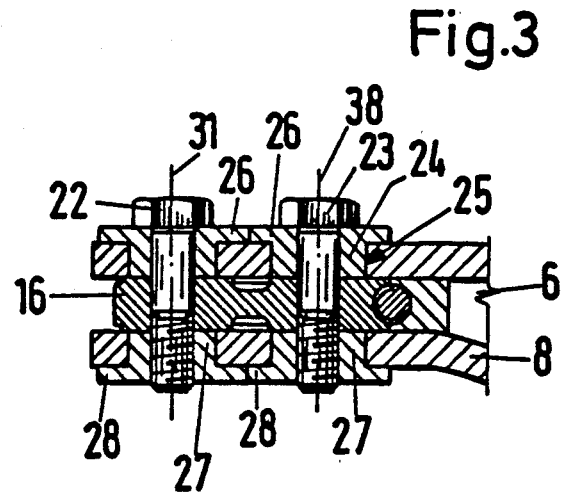

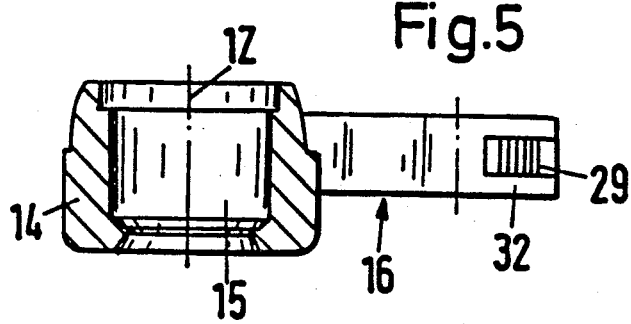
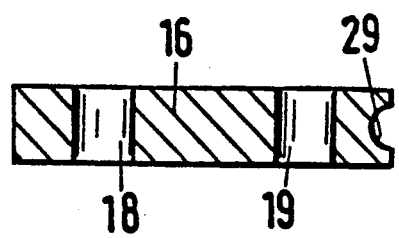
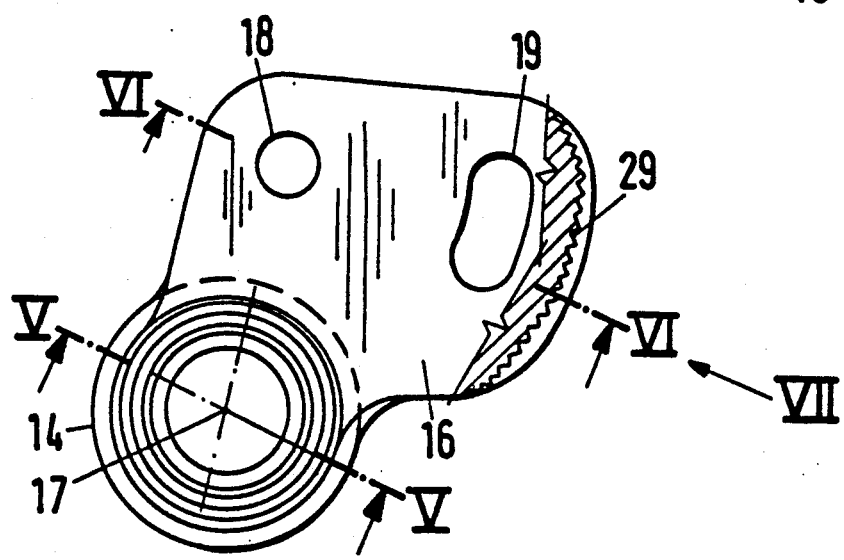
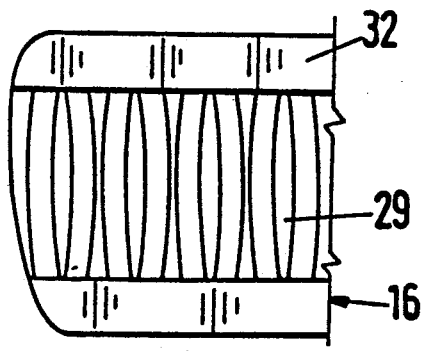

ADJUSTABLE FASTENING OF A BALL JOINT TO A TIE ROD FOR STEERING LINKAGES OF MOTOR VEHICLES

TECHNICAL FIELD

The object of the invention is an adjustable attachment of a ball-and-socket joint at a tie rod for steering linkages of motor vehicles with a ball pin, movable in all directions inside a universal joint housing, which is arranged in a bracket with a bearing hole, a tie rod-rigid attachment element, which grips through the bearing bore, so that the bracket is pivotable about the attachment element, and a locking element engaging the bracket for fastening the ball-and-socket joint in a certain swivel position, wherein the locking element is a screwed connection which is arranged perpendicularly to the axis of the attachment element and which meshes with the toothing provided at the bracket.

BACKGROUND OF THE INVENTION

From DE-OS 37 39 704 (U.S. Pat. No. 4,953,894), a generic type of adjustable attachment of a ball-and-socket joint at a tie rod for steering linkages of motor vehicles is known, wherein the ball-and-socket joint has a ball pin which is arranged inside a universal joint housing and is movable in all directions about a central axis and the central axis can be displaced with respect to the tie rod by adjusting the ball-and-socket joint. Furthermore, the ball-and-socket joint has a bracket which has a bearing bore which is arranged eccentrically to the central axis of the movements of the ball pin. The bracket with its bearing bore is pivotably arranged at a tie rod-rigid attachment element. For the purpose of fastening the ball-and-socket joint in a certain swivel position, the tie rod has a screwed connection which is in the form of a locking element.

In order to adjust the attachment of the ball-and-socket joint, this screwed connection must be loosened. Following the loosening of the screwed connection, a tool is pushed between the bracket and a connecting cross-piece of the tie rod, so that a worm gear, arranged in the lower area of the tool, engages a toothing which is laterally arranged at the bracket. By turning the tool, the bracket may be pivoted about the tie rod-rigid attachment element. After the desired pivot angle has been set, the screwed connection is tightened for the fastening of the ball-and-socket joint in a certain swivel position and the tool is removed.

A disadvantages of this adjustable attachment of a ball-and-socket joint at a tie rod lies in that the adjustment is vary labor-intensive. Furthermore, the fastening of the ball-and-socket joint in a certain swivel position through the screwed connection takes place only in a force-locking manner, so that during operation of the vehicle an unintended shift of the alignment may occur. Also, this adjustable attachment has the disadvantage that for the adjustment a special tool is required.

SUMMARY OF THE INVENTION

Based on this state of the art, it is the task of the invention to create an adjustable attachment of a ball-and-socket joint at a tie rod which is simple and can be adjusted without a special tool, involves minimal construction costs and, nonetheless, safeguards against and unintended shift of the attachment during operation of the vehicle.

The solution to this task provides that the screwed connection has a bolt and a nut, wherein the nut is supported on a hub which is vertically inclined by a slight angle towards the axis of the screwed connection.

With this adjustable attachment of the ball-and-socket joint the adjustment takes place in that the belt, arranged perpendicularly to the axis of the attachment element, is turned so that the bracket with the toothing arranged thereon is pivoted about the tie-rigid attachment element. After setting the desired pivot angle, the nut is tightened so that the attachment plate is secured in a form-locking manner via the toothing and the bolt meshing with same. Thus, the screwed connection, consisting of a bolt and nut, serves for adjusting the bracket as well as for connecting same in a form-locking manner with the universal joint housing and the guide rod. Due to the incline of the contact surface for the nut, during tightening, the threaded end of the bolt glides in the direction toward the ball center of the joint. A flank clearance is avoided. Furthermore, the attachment has the advantage that the adjustment can be undertaken with conventional tools, such as a ring- or box-end wrenches or with a ratchet and socket.

One arrangement of the invention has a second locking element which is in the form of a screwed connection guided through a bore of the tie rod, which grips through an oblong hole of the bracket and wherein the axis of the oblong hole extends parallel to the axis of the bearing hole and the oblong hole extends along an arc around the bearing hole. This second locking element serves as an additional safeguard against an unintended shift of the adjustable attachment during operation of the vehicle.

In an addition arrangement, it is provided that the toothing is in the form of an internal toothing in a circle segment arranged at a side surface of the attachment plate. Through this arrangement, the adjustable attachment requires only a very small space. Preferably, the circular segment has an angle of contact of approximately 90°. Sufficiently large frictional areas are obtained so that the surface pressure between the screwed connection and the toothing, during adjustment of the bracket and during operation of the vehicle, does not become too great. Furthermore, through this arrangement, simple adjustment of the adjustable attachment is assured.

Preferably, the angle between the contact surface and the line perpendicular to the axis of the screwed connection is between 1° and 1.5°. The adjustment operation is aided by means of a plane-parallel disk between the nut and the contact surface.

BRIEF DESCRIPTION OF THE DRAWINGS

Further details and advantages are shown from the following description of the accompanying drawings that show a preferred practical form of an adjustable fastening according to the invention. The drawings show:

FIG. 1 an adjustable fastening of a ball joint in section along the line I—I of FIG. 2;

FIG. 2 the same adjustable fastening in top view and in partial section;

FIG. 3 the same adjustable fastening as partial section along the line III—III of FIG. 2 in enlarged form;

FIG. 4 a ball joint of the adjustable fastening in top view and in enlarged form;

FIG. 5 the same ball joint in section along the line V—V of FIG. 4;

FIG. 6 the same ball joint in section along the line VI—VI of FIG. 4; and

FIG. 7 the gear-tooth system of the ball joint in a partial view from the observation direction VII of FIG. 4 and in enlarged form.

DESCRIPTION OF THE PREFERRED EMBODIMENT

FIGS. 1 and 2 show a tie rod 1 that exhibits an adjustable-mounted ball joint 2 on one end and a nonadjustable-mounted ball joint 3 on the other end. The tie rod 1 is constructed essentially U-shaped in cross-section. A web bar 6 between side wall 7,8 ends before the end of tie rod 1 so that a forkhead 9 is formed there. With respect to the fastening of ball joint 2, the side walls 7,8 are elevated in the area of the forkhead. In addition, forkhead 9 exhibits an edge cut 11 proceeding obliquely to tie rod axis 10 that permits a swiveling movement of ball joint 2.

Ball joint 2 has a ball-ended wrist pin 12 that is held in a universal joint housing with interposition of a split bearing 13.

Details of universal joint housing 14 can be described in better manner by means of FIGS. 4 through 6. The universal joint housing 14 has a cup-shaped recess 15 for the split bearing 13 and ball-ended wrist pin 12, on which a fastening plate 16 is flanged laterally that is aligned perpendicular to the center axis 17 of the motion of ball-ended wrist pin 12.

Fastening plate 16 has a bearing hole or aperture 18 that is arranged eccentrically to the center axis 17. Fastening plate 16 in addition exhibits a longitudinal hole or aperture 19 that extends around bearing hole 18 in a circular arc.

As apparent from FIGS. 1 through 3, fastening plate 16 is inserted between side walls 7, 8 of forkhead 9 and is attached there and locked by means of screws 22, 23. Screws 22, 23 on the head side are introduced into inserts 24 of plastic or metal that are inserted into openings or apertures 25 of forkhead 9 and are held there axially by fastening flanges 26. On the thread side, screws 22, 23 are screwed into inserts 27 which also exhibit fastening flanges 28. The inserts serve particularly for uniform force introduction into tie rod 1.

By tightening of screws 22, 23, side walls 7, 8 of tie rod 1 are drawn together in the area of forkhead 9, in which fastening plate 16 and thus ball joint 2 are fixed in the desired swiveled position. A readjustment of the connection is possible in simple manner by loosening of screws 22, 23, swiveling fastening plate 16 around screw 22 and subsequent tightening of the two screws 22, 23.

For fine adjustment of the fastening and for locked fixing of the fastening plate, fastening plate 16 exhibits a gear-tooth system 29 which is a toothed peripheral segment arranged on a side surface 32 of fastening plate 16 for facilitation of adjustment or readjustment. Gear-tooth system 29 is designed as an internal system in a circular section with a contact angle of approximately 90° and engages with threaded joint 30 which is arranged perpendicular to axis 31 of screw 22 and exhibits a bolt 33 and a nut 34.

Nut 34 is supported on a mounting surface 35, which is arranged on screw axis 36 inclined to the perpendicular by a small angle of approximately 1° to 1.5°. A plane-parallel washer disk 37 is found between mounting surface 35 and nut 34. A head of the bolt 33 engages a surface of the end of the tie rod 1 opposite the mounting surface 35. Thus, a portion of the mounted surface 35 nearest to the gear toothed system 29 is closer to the surface engaged by the head of the bolt 33 than other portions of the mounting surface 35.

As seen particularly well from FIG. 4, the gear-tooth system 29 is designed as an internal system is arranged on a circular arc around the bearing hole 18 so that they can rotate the fastening plate 16 around the bearing hole 18.

First, screws 22 and 23 are loosened for adjustment of the track. In connection with this, nut 34 screwed onto bolt 33 is loosened so that bolt 33 can be turned, and fastening plate 16 is swiveled in the desired position of the gear-tooth system found in engagement with bolt 33.

After adjustment of the desired swiveled position, nut 34 and screws 22, 23 are tightened again for fixing this swiveled position.

Since all screw joints exhibit a commercial hexagonal shape, adjustment of the fastening is possible with normal ring wrenches or spanner wrenches or a ratchet wrench with a hex socket insert.

The invention is not limited to the depicted practical example. Rather, various changes and modifications are possible without leaving the scope of the invention. For example, threaded joint 30 also can be arranged above or below fastening plate 16 and engage with the gear-tooth system arranged on or below fastening plate 16. Further, threaded joints other than those shown in the practical example can be used.

This invention has been described with reference to a preferred embodiment. Modifications and changes may become apparent to one skilled in the art upon reading and understanding this specification. It is intended to cover all such modifications and changes within the scope of the appended claims.

Having described the invention, the following is claimed:

1. An adjustable attachment of a ball-and-socket joint (2) to a tie rod (1) for steering linkages of motor vehicles, with a ball pin (12) which is movable on all sides and is arranged in a universal joint housing (14), which is arranged with a bracket (16) with a bearing bore (18), a tie rod-rigid attachment element (22), which grips through the bearing bore (18), so that the bracket (16) is pivotably arranged about the attachment element (22) and a locking element engaging the bracket (16) for locking the ball-and-socket joint (2) in a certain swivel position, wherein the locking element is a screwed connection (30), which is arranged perpendicularly to an axis (31) of the attachment element (22) and meshes with a toothing (29) arranged on the bracket (16), characterized in that the screwed connection (30) has a bolt (33) and a nut (34), wherein the nut (34) is supported on a contact surface (35), which is inclined by a small angle from a plane perpendicular to the axis of the screwed connection (30).

2. An attachment as set forth in claim 1 including a second locking element (23) which is in the form of a screwed connection guided through a bore (19) of the tie rod (1), which grips through an oblong hole (19) of the bracket (16) and wherein an axis (38) of the oblong hole (19) extends parallel to an axis (31) of the bearing bore (18) and the oblong hole (19) extends along an arc around the bearing bore (18).

3. An attachment as set forth in claim 2, wherein the toothing (29) is one the attachment plate (16) and is formed at a circular segment, arranged at a face (32) of the attachment plate (16).

4. An attachment as set forth in claim 3, wherein the circular segment has an arc of approximately 90°.

5. An attachment as set forth in claim 1, wherein the angle between the contact surface (35) and the plane perpendicular to the axis of the screwed connection (30) is 1° to 1.5°.

6. An attachment as set forth in claim 1, wherein between the nut (34) and the contact surface (35) a plane-parallel disk (37) is arranged.

7. An attachment as set forth in claim 1 wherein the toothing (29) is on the attachment plate (16) and is formed at a circular segment, arranged at a face (32) of the attachment plate (16).

8. An attachment as set forth in claim 7, wherein the circular segment has an arc of approximately 90°.

9. An adjustable linkage for a motor vehicle, said linkage comprising:
a tie rod end having a first attachment aperture and first and second adjustment contact surfaces;
a fastening portion of a joint housing located adjacent to said tie rod end, said fastening portion having a second attachment aperture aligned with the first attachment aperture, said fastening portion having a toothed peripheral segment;
attaching means extending through the first and second attachment apertures for connecting and holding said tie rod end and said fastening portion together upon tightening of said attaching means and for permitting pivoting of said fastening portion relative to said tie rod end upon loosening of said attaching means; and
means for pivoting and for preventing pivoting of said fastening portion relative to said tie rod end including bolt means extending transverse to the extend of said attaching means, said bolt means having a head portion engaged with said first adjustment contact surface of said tie rod end and a threaded portion engaged with said toothed peripheral segment of said fastening portion for relatively displacing said toothed peripheral segment upon rotation of said bolt means and for preventing displacement of said toothed peripheral segment when rotation of said bolt means is prevented, and nut means positioned on said threaded portion and engaged with the second adjustment contact surface of said tie rod end for permitting rotation of said bolt means upon loosening of said nut means and for preventing rotation of said bolt means upon tightening of said nut means, at least one of said first and second adjustment contact surfaces being inclined relative to a plane perpendicular to the extend of said bolt means for urging said threaded portion of said bolt means toward said toothed peripheral segment.

10. A linkage as set forth in claim 9, wherein said tie rod end being bifurcated into two prong ends, the first attachment aperture extending through both of said two prong ends, said fastening portion being located between said two prong ends, said attaching means squeezing said two prong ends into engagement with said fastening portion together upon tightening of said attaching means.

11. A linkage as set forth in claim 10 wherein said attaching means includes a threaded bolt and an internally threaded flange insert.

12. A linkage as set forth in claim 9, wherein said tie rod end having a third attachment aperture spaced from the first attachment aperture, said fastening portion having a fourth arc-shaped aperture at least partially aligned with the third aperture, a second attaching means extends through the third and fourth apertures, said second attaching means being slidable along the fourth arc-shaped aperture to permit pivoting of said fastening portion relative to said tie rod end.

13. A linkage as set forth in claim 9, wherein an angle between said one of said first and second adjustment contact surfaces and the plane perpendicular to the extend of said bolt means being 1° to 1.5° for urging said threaded portion of said bolt means toward said toothed peripheral segment.

14. A linkage as set forth in claim 9, wherein said one of said first and second alignment contact surfaces being the second adjustment contact surface.

15. A linkage as set forth in claim 14, wherein said second adjustment contact surface having first and second portions positioned near and away from said tooth peripheral segment, respectively, said first portion being closer to said first adjustment contact surface than said second portion for urging said threaded portion of said bolt means toward said toothed peripheral segment.

16. A linkage as set forth in claim 9, wherein said nut means includes an internally threaded nut and a washer disk for aiding movement of said threaded portion of said bolt means toward said toothed peripheral segment.

* * * * *

UNITED STATES PATENT AND TRADEMARK OFFICE
CERTIFICATE OF CORRECTION

PATENT NO. : 5,213,435
DATED : May 25, 1993
INVENTOR(S) : Lothar Broszat

It is certified that error appears in the above-identified patent and that said Letters Patent is hereby corrected as shown below:

Column 5, line 37, change "extend" to -- extent --.

Column 6, line 4, change "extend" to -- extent --.

Column 6, line 31, change "extend" to -- extent --.

Column 6, line 34, change "alignment" to -- adjustment --.

Signed and Sealed this

Twenty-fifth Day of January, 1994

Attest:

BRUCE LEHMAN

Attesting Officer     Commissioner of Patents and Trademarks